United States Patent [19]

Plympton

[11] 3,960,168
[45] June 1, 1976

[54] VALVE LOCKING DEVICE

[75] Inventor: Michael R. Plympton, Houston, Tex.

[73] Assignee: ACF Industries, Incorporated, New York, N.Y.

[22] Filed: Sept. 4, 1975

[21] Appl. No.: 610,475

[52] U.S. Cl. ............................................. 137/385
[51] Int. Cl.² ........................................ F16K 35/00
[58] Field of Search ........................ 137/383–385; 70/177–179

[56] References Cited
UNITED STATES PATENTS 3,401,715   9/1968   Johnson et al...................... 137/385

*Primary Examiner*—Henry T. Klinksiek
*Attorney, Agent, or Firm*—Eugene N. Riddle

[57] ABSTRACT

A locking device for a valve having a rotatable stem extending from a body and a handle secured to the stem for the purpose of preventing rotation of the handle and movement of the valve member. A fixed locking member is mountable on the valve body. A movable locking member is mounted on the handle for rotation therewith and for relative movement outwardly and inwardly of the valve body and fixed locking member. Interfitting cooperating members on the fixed locking member and the movable locking member are engaged at a desired position of the valve member upon inward movement of the movable locking member relative to the fixed locking member to prevent rotation of the handle and are disengaged to permit rotation of the handle upon outward movement of the movable locking member relative to the fixed locking member.

12 Claims, 15 Drawing Figures

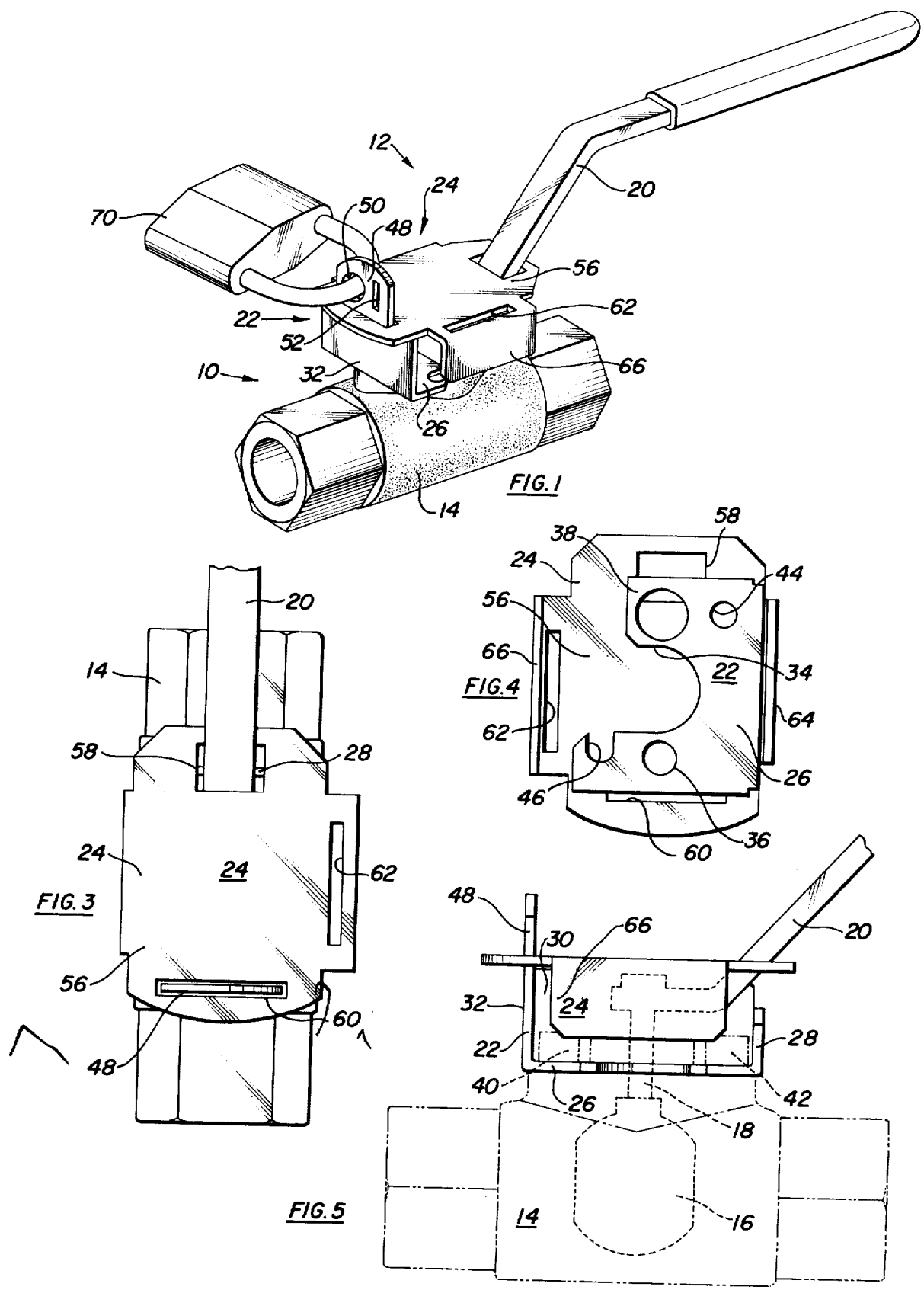

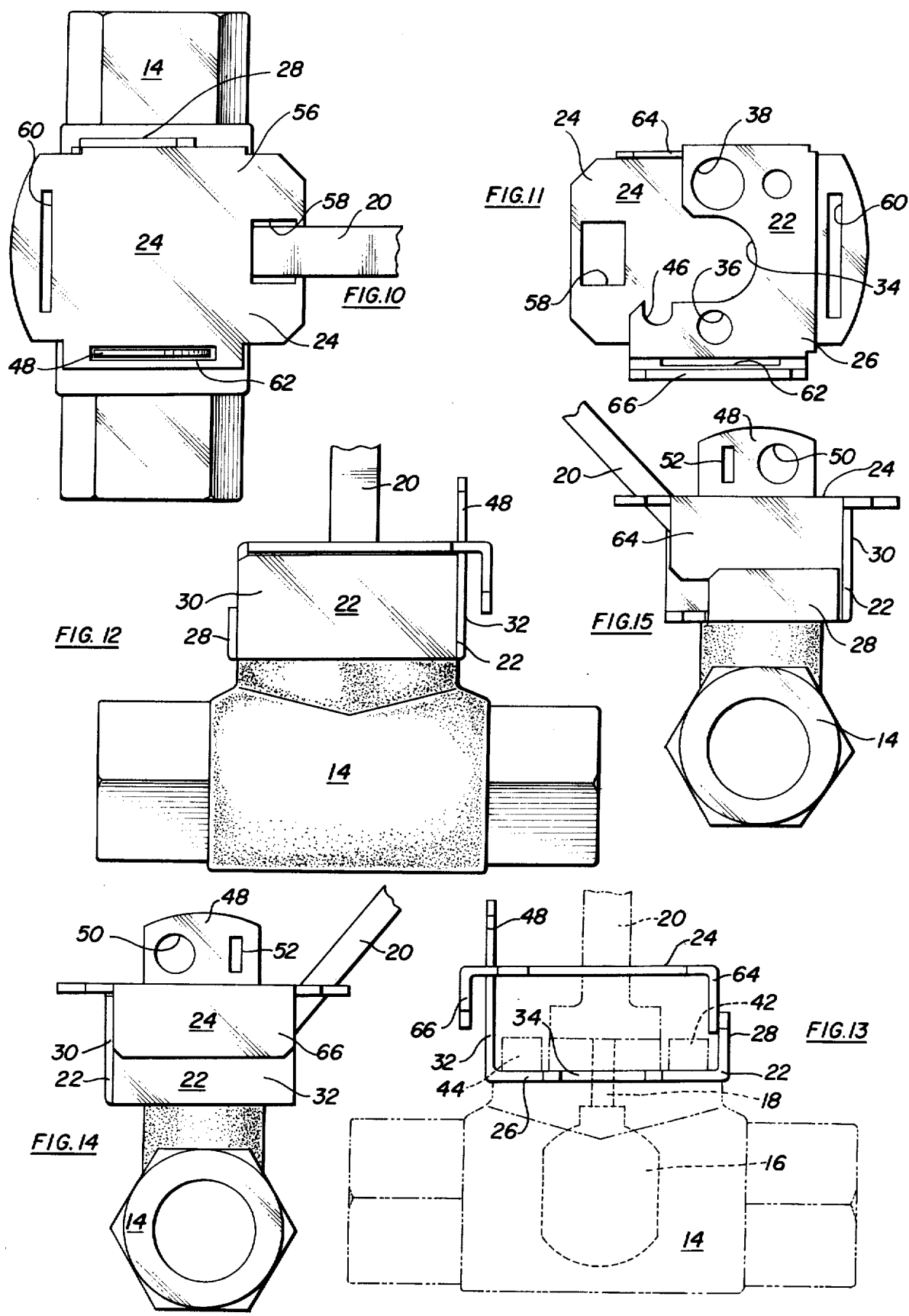

VALVE LOCKING DEVICE

BACKGROUND OF THE INVENTION

This invention is related to locking devices for valves. More specifically, the invention is related to a device for locking the stem and handle of a valve having a rotatable stem to secure the stem against manual rotation when it is placed in one position. This valve locking device is of the type which secures the handle and encloses the juncture of the handle and valve stem to prevent tampering with or removal of the handle from the valve stem.

Prior art valve locking devices which are attached to valves having a rotatable stem turned by a handle of generally two basic types, one of which completely encloses the valve handle with the enclosure being lockable and the other type secures the handle to the valve body or some fixture attached to the valve body. In the second type, the fixed portion of the device has an aperture which lines up with another aperture on a portion of the device which is mounted with the handle so that a padlock or other securing device can be inserted through the apertures. A typical example of the second type of device is shown in U.S. Pat. No. 3,865,130. Another type of valve locking device is known which has a lug integrally formed with the valve body and another lug integrally formed with the valve stem or upper portion of the valve closure member with apertures provided through the lugs for inserting a padlock or the like. A common fault in the second type of valve locking device is that they can be circumvented by removing the valve handle from the locking plate member or by breaking a lug thereby gaining access to the valve stem. In doing this, the valve stem can be rotated by using another handle, a wrench, or by other tools. A disadvantage of the valve locking structure's first type described is that they are expensive to manufacture, cumbersome to install in some places, and furthermore they do not give a visual indication of the position of the valve.

SUMMARY OF THE INVENTION

In an embodiment of the valve lock device of this invention, the structure includes a fixed locking member rigidly mountable on a valve body and a movable locking member mountable on the valve stem handle. The fixed locking member and the moving lockable members are constructed so they are interfitting and can be engaged when the valve handle is in a predetermined position or positions. The movable locking member is movably mounted on the handle for inward and outward movement relative to the fixed locking member and the valve body. This particular mounting is constructed so the movable locking member can be moved to an out-of-the-way position before rotating the stem and then moved to an engaged position where interfitting portions of the two locking members cooperate and join to secure the valve handle and stem. The fixed and movable locking members are constructed so they enclose the juncture of the stem and handle thereby providing a structure which will prevent tampering with or removing of the handle from the stem when the locking device is secured and locked.

One object of this invention is to provide a valve locking device overcoming the aforementioned disadvantages of the prior art devices.

Still, one other object of this invention is to provide a valve locking structure having a fixed locking member rigidly mountable on a valve body and a movable locking member mountable on a valve handle which are provided with interfitting structural portions which can be engaged for securing the valve stem and handle in a predetermined position.

Still, another object of this invention is to provide a valve locking device which has a fixed locking member and a movable locking member that functions cooperatively in a structure to enclose the juncture of the rotatable valve stem and valve handle thereby preventing tampering with or removing of the handle from the stem when the device is locked.

Still, another object of this invention is to provide a valve locking device which can be easily mounted on a valve body and a valve handle to secure the handle in either of two positions to provide a device that can be secured by a padlock, a seal ring, or other locking and securing devices.

Various other objects, advantages and features of this invention will become apparent to those skilled in the art from the following discussion, taken in conjunction with the accompanying drawings, in which:

DESCRIPTION OF THE DRAWINGS

FIG. 1 is a perspective view of the valve locking device of this invention mounted on a valve and shown in a first position with a padlock secured with the locking device;

FIG. 3 is a top plan view of the locking device and a valve with the locking device shown in the first position;

FIG. 4 is a bottom plan view of the locking device alone and shown in the first position;

FIG. 5 is a side elevation view of the valve locking device and a valve shown in the first position with the valve closure member and portions of the valve stem and handle structure shown in dashed lines;

FIG. 10 is a top view of the valve locking device and a valve with the locking device and a valve shown in a second position;

FIG. 11 is a bottom plan view of the locking device alone shown in the second position;

FIG. 12 is a side elevation view of the locking device mounted on a valve and shown in the second position;

FIG. 13 is a side elevation view of the locking device and a valve showing the second position with this view taken from the side opposite to that shown in FIG. 12 and showing the valve closure member and stem shown in dashed lines for clarity;

Figure 6:
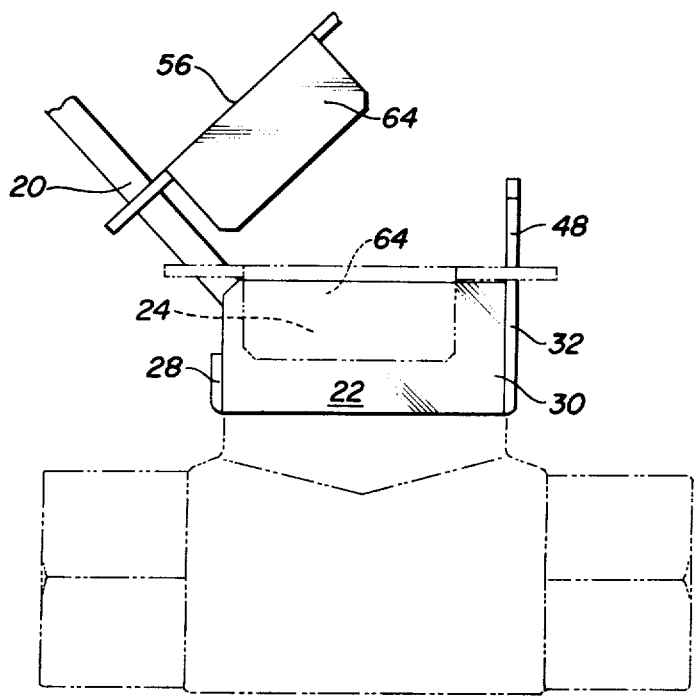
FIG. 6 is a side elevation view of the locking device and a valve taken from the side of the locking device opposite to that shown in FIG. 5, wherein the movable locking member shown in a raised position on the handle in solid lines and in engaged position with a fixed locking member in dashed lines.
Figure 8:
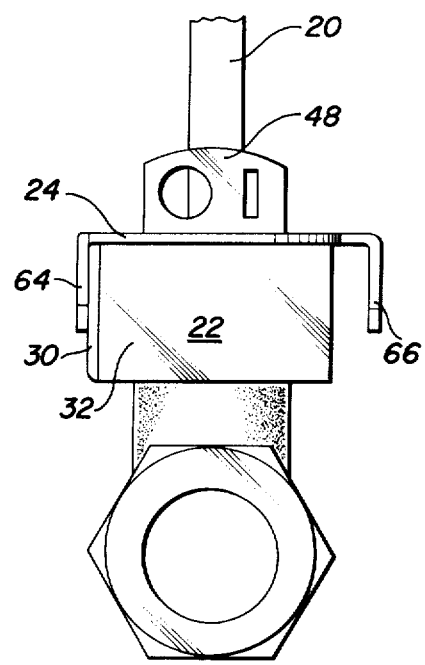
FIG. 8 is an end elevation view of the locking device and a valve shown in the first position with the view taken from the end of the locking device opposite that shown in FIG. 7.
Figure 7:
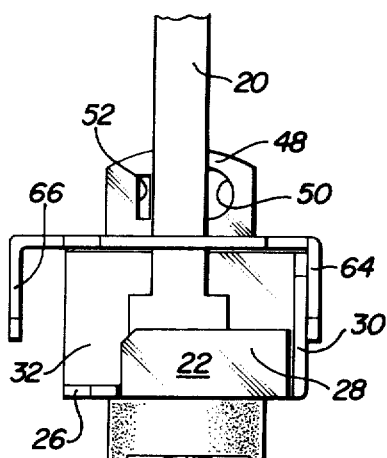
FIG. 7 is an end elevation view of the locking device and a valve taken with the locking device shown in the first position wherein the view taken from the end of the locking device having the interfitting lug structure.

FIG. 14 is an end elevation of the locking device in a valve with the locking device shown in the second position with the view taken from the end of the locking device having the interfitting lug structure, and FIG. 15 is an end elevation view of the locking device and a valve with a locking device shown in the second position and the view taken from the end opposite to the end of the locking device shown in FIG. 14.

The following is a discussion and description of preferred specific embodiments of the valve locking device of this invention, such being made with reference to the drawings, whereupon the same reference numerals are used to indicate the same or similar parts and/or structure. It is to be understood that such discussion and description is not to unduly limit the scope of the invention.

DETAILED DESCRIPTION

Figure 2:
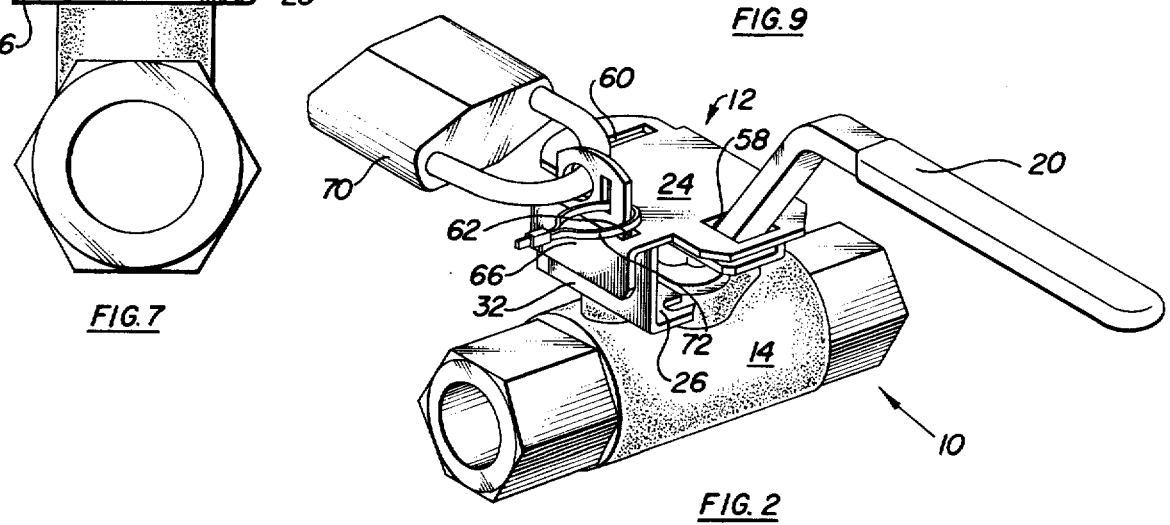
FIG. 2 is a perspective view of the valve locking device of this invention mounted on a valve and shown in a second position with a seal ring attached to the locking device.

FIG. 1 shows a valve 10 having the locking device 12 of this invention mounted thereon. Locking device 12 as it is shown in FIG. 1 is oriented in a first position. FIG. 2 shows valve 10 and locking device 12 in a second position. Valve 10 is a type of valve which has a body 14 enclosing a movable valve closure member 16 which is secured to and moved by a rotatable stem 18 as shown in FIG. 5. Handle 20 is secured to the end of stem 18 and extends therefrom. Handle 20 provides a lever for manually rotating stem 18 which in turn controls the position of valve closure member 16. It is to be understood that valve 10 can be constructed with a valve closure member in the form of a ball, a plug, a butterfly, a gate, or any other type of valve closure apparatus which can be operated by a rotatable stem mounted in valve body 14.

Figure 9:
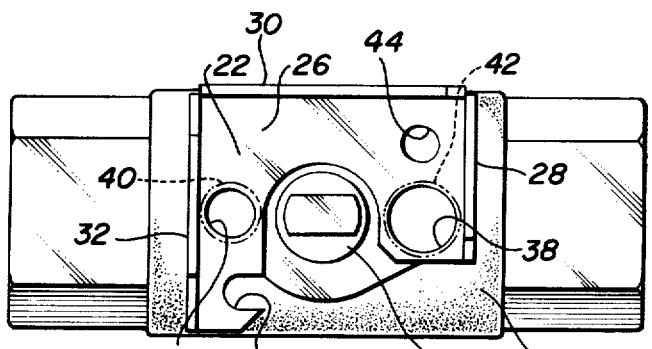
FIG. 9 is a top plan view of the upper side of the fixed locking member mounted on a valve with the valve handle omitted for clarity.

Valve locking device 12 includes a fixed locking member 22 which is rigidly mounted on valve body 14, and a movable locking member 24 which is mounted on handle 20. The movable locking members 22 and 24 are constructed as separate individual pieces which are constructed to be mounted with valve 10 and they have an interfitting structure which can be engaged when locking device 12 is positioned in either of its alternate positions. Fixed locking member 22 has a base 26 which is mounted on valve body 14 and it also has upright side walls 28, 30, and 32 on three sides of the perimeter of base 26. FIG. 9 shows fixed locking member 22 alone mounted on the top of valve body 14. FIG. 4 shows a bottom plan view of base 26. Base 26 is provided with a plurality of apertures for mounting fixed mounting member 22 on valve body 14. Base 26 has an arcuate cut-out portion 34 extending from a center portion thereof to one side for positioning it around the stem portion of valve body 14. A pair of apertures 36 and 38 through base 26 are positioned on opposed sides of arcuate cut-out portion 34. A pair of bolts 40 and 42 are positioned through apertures 36 and 38 respectively and are threadedly engaged mounted in valve body 14 for securing fixed locking member 22 to valve body 14. An aperture 44 and a U-shaped slot 46 are oppositely positioned around arcuate portion 34 in a spaced relation to apertures 36 and 38 as shown clearly in FIGS. 4, 9, and 11. Aperture 44 and slot 46 are provided for mounting fixed locking member on valve body structures which have mounting bolt apertures in an offset relation. It is to be understood that base 26 can be constructed with aperture configurations other than that shown without departing from the scope of the invention.

The side walls of fixed locking member 22 extend outward in one direction from base 26 in a substantially perpendicular relationship. Sides 28, 30, and 32 intersect at corners of base 26. Side 32 is provided with a lug 48 extending from its outer edge portion. Lug 48 is an integral portion of the interfitting structure on the locking members and it extends substantially above side 30 at a portion of side 32. Lug 32 is 48 with an essentially round aperture 50 and an elongated slot 52. Side 30 is the same height as side 32, excluding lug 48. Side 28 is slightly shorter than sides 30 and 32 to allow clearance for rotation of handle 20.

Movable locking member 24 is mounted on a midportion of handle 20. Movable locking member 24 has a top 56 with a handle receiving aperture 58 through one end portion thereof for receiving and mounting handle 20. An additional pair of apertures 60 and 62 are provided through top 56 of movable locking member 24 to receive lug 48. Apertures 60 and 62 form part of the interfitting structure of the locking members. Apertures 60 and 62 are located in a spaced relation so that one of them can be positioned over lug 48 when valve handle 20 is positioned in either of the two operating positions of valve 10. Aperture 60 is positioned on the opposite side of movable locking member 24 from aperture 58, and aperture 62 is positioned at a point which is substantially in a perpendicular relation to a line through apertures 58 and 60 and positioned at an edge portion of top 56. Movable locking member 24 has a pair of side walls 64 and 66 extending in the same direction from top 56. Sides 64 and 66 extend from top 56 in a perpendicular relationship as shown. Sides 64 and 66 extend downwardly when locking device 12 is mounted on valve 10 as shown in FIG. 1. Side 66 is adjacent to aperture 62 and side 64 is on the opposite side of top 56. Apertures 60 and 62 are preferably elongated slots as shown clearly in FIGS. 2 and 10. Sides 64 and 66 are preferably essentially the same height measured from top 56. Elongated slots 60 and 62 are positioned in a perpendicular relation to each other as shown clearly in FIGS. 2, 3, and 10.

At this point it is to be noted that lug 48 and slots 60 and 62 can be constructed in a physical configuration different than that shown in the drawings, if desired. For example, the lug can be constructed in an elongated cylindrical shape with a round or rectangular cross section and the slots can be shaped to fit around the lug. Additionally, it is to be noted that if desired the lug can be constructed with only one aperture for mounting a lock or seal ring instead of two apertures as shown in the drawings.

It is to be noted that movable locking member 24 can be mounted on fixed locking member 22 in two alternate positions as illustrated in FIGS. 1 and 2. Regardless of which position the movable locking members are placed together, they form an enclosure structure which will enclose the juncture of valve stem 18 and handle 20. By enclosing the juncture of handle 20 and valve stem 18 it prevents tampering with handle 20 or removing it from stem 18 once locking device 10 is secured, such as by padlock. If the juncture of stem 18 and handle 20 was not enclosed at the time the handle was secured then it would be possible to handle 20 to be removed and valve stem 18 rotated by using another handle, a wrench, or some other tool. FIGS. 1 and 3–8 show locking device 12 with movable locking member 24 and fixed locking member 22 positioned in a first position. It is to be noted that the first position will align valve handle 20 with the flow conduit of valve 10 which is the normal conventional indication that the valve is in open position. In the first position movable locking member side 64 overlaps the exterior of fixed locking member side 30 and lug 48 is positioned through aperture 60 with the top 56 resting on the outer edge portion of fixed locking member side 32. Movable locking member side 66 is positioned in a spaced relation to the edge portion of fixed locking member 22 which does not have an upright side wall. Movable locking member 24 is supported by the outer edge portion of side 30 in combination with the outer edge portions of side 32 which are adjacent to lug 48. Handle 20 extends upwardly in an inclined fashion through aperture 58. When locking device 12 is secured with a padlock 70 as shown in FIG. 1, movable locking member 24 is secured to fixed locking member 22 by the shackle of the padlock through aperture 50. In the secured position the inclined relation of handle 20 prevents movable locking member 24 from being tilted to gain access to the connection of handle 20 and stem 18 and it also prevents rotation of handle 20 relative to valve body 14 due to the interfitting relation of the locking members. At this point it is important to note the inclined relation of handle 20 to movable locking member 24 prevents raising of the movable locking member 24 to gain access to the mounting of handle 20. If a valve handle is constructed different from that shown then it must have a portion adjacent to the outer side of top 56 so as to prevent raising of movable locking members 24 when it is in a secured and locked condition. In the event it is not desired to padlock locking device 12 a seal ring can be attached through slot 52. The use of a seal ring will not prevent changing the position of valve 10, however it will provide an indication that the locking device has been tampered with and most likely position of valve 10 has been changed.

FIG. 6 shows a movable locking member 24 in a raised position on handle 20. In order to rotate handle 20 relative to valve body 14, movable locking member 24 must be removed from lug 48 and raised to a position approximately as shown. Removing movable locking member 24 from lug 48 is accomplished by first removing the padlock or the seal ring if either is present then lifting movable locking member 24 in an upward swinging motion about handle 20. FIG. 6 illustrates the position of movable locking member 24 as valve 10 is being changed. Once valve handle 20 is positioned as desired in another position then movable locking member 24 is lowered on handle 20 with the appropriate slotted aperture engaged with lug 48 and the sides of the locking members engaged in their respective interfitting positions.

FIG. 2 and FIGS. 10 and 12–15 show locking device 12 in its second position. Second position of locking device 12 orients handle 20 perpendicular to the flow line of valve 10 which is the normal conventional position of a valve handle when a valve is closed. In this second position movable locking member side 66 overlaps fixed locking member side 32 and is spaced therefrom. On the opposite side of the locking members movable locking member side 64 is placed to the inner side of fixed locking member side 28 as shown in FIGs. 13 and 14. In the second position, lug 48 extends through slotted aperture 62 with movable locking member top 24 resting on the outer edge of movable locking member side 30 and the outer edge portions of fixed locking member side 32 which are adjacent to lug 48. As shown in FIGS. 12–15, the juncture of handle 20 and stem 18 is substantially enclosed by the interfitting and cooperating locking members. By enclosing the juncture of handle 20 and stem 18 when locking device 12 is placed in the second position and secured by padlock, seal ring, or other suitable securing device to prevent tampering with the position of valve 10. Handle 20 cooperates with lug 48 and other portions of the locking device structure to prevent rotation of handle 20 and to prevent free access to the juncture of handle 20 and stem 18. FIG. 2 shows locking device 12 placed in the second position and secured by a seal ring 72.

In practice in manufacturing the valve locking device of this invention, it has been found that the movable locking member and the fixed locking member can be relatively easily constructed using conventional techniques. In the manufacture of the device, it has been found that the separate members thereof can be formed by stamping them from sheet material and folding the members to the desired configuration and shape as shown in the drawings. In forming the fixed locking member 22 it is to be understood that the configuration of apertures in base 26 can be rearranged or modified at the desire of the user in order to adopt the locking device for mounting on different valve body structures.

In using the valve locking device of this invention; it is seen that same provides a structure for use with a valve to secure a handle on the valve to prevent unauthorized changing of the valves' position. The valve locking device structure provides a structure which can be secured by a padlock or other suitable securing device. The locking device encloses the juncture of the valve stem and handle as well as the point of attachment of the locking device so that it prevents tampering with the valve structure to circumvent the locking device. The locking device of this invention can be mounted on substantially any valve by the structure where a rotatable stem actuates the valve closure member and where the valve body structure is such that the fixed locking member of the device can be securely mounted thereon. It is to be noted that the locking device of this invention is provided with a structure for securing the device to be locked by a padlock or similar securing and locking device or affixed with a seal ring or the like so that it would be obvious that the locking device had been tampered with. Additionally it is important to note the valve locking device of this invention can be used with a two part valve as shown in the drawings it can be used with a multi-port valve having three or more ports where two or more positions of the valve closure member are controlling. In the multiport valve application valve locking device 12 can be used to secure two positions of the valve.

As will become apparent from the foregoing description of the applicant's valve locking device, a relatively simple and inexpensive means has been provided to lock and secure the handle of a valve having a rotatable stem. The locking device structure is simple in construction thus economical to manufacture and attach to valves. The valve locking device can obviously be used in numerous applications where the security of a valve is important as well as in situations where indication that the valve had been changed is required. As well as providing security for a valve, the locking device of this invention is constructed to secure the valve handle in either of two alternate positions. This feature allows a valve to be secured in either the open position or the closed position or a first and second position as the case may be for a particular use.

What is claimed is:

1. A stem locking device for a valve having a body, a rotatable stem and a handle secured to the stem for manual rotation of same between two positions, said locking device comprising:
   a. a fixed locking member and a movable locking member;
   b. said fixed locking member being mountable on a valve body;
   c. said movable locking member being mountable on a handle for relative movement outwardly and inwardly relative to said valve body, and
   d. interfitting cooperating means on said fixed locking member and said movable locking member engageable at one position upon inward movement of said movable locking member relative to said fixed locking members to prevent rotation of said handle.

2. The locking device of claim 1, additionally including means on said interfitting and cooperating means to receive and mount a lock to secure said interfitting and cooperating means for securing said handle from rotation when positioned in one position.

3. The locking device of claim 2, additionally including means on said movable locking member to enclose and cover the juncture of said handle and said rotatable stem for preventing tampering with and removing said handle from said rotatable stem when said locking device is secured and locked.

4. The locking device of claim 3, additionally including means on said fixed locking member cooperating with said means to enclose and cover on said movable locking member to enclose the juncture of said handle and said rotatable stem at a point of attachment of said valve body and said fixed locking member for preventing tampering with mounting of said locking members and said handle when secured and locked.

5. The locking device of claim 4, wherein:
   a. said interfitting and cooperating means has a lug member on said fixed locking member and an aperture through said movable locking member, said lug being engageable in said aperture in an interfitting and cooperating relation when said valve handle is in a first position, and
   b. said lug having said means to mount a lock.

6. The locking device of claim 5, wherein:
   a. said movable locking member having a handle receiving aperture therethrough for receiving said handle and mounting said movable locking member on said handle, and
   b. said movable locking member having another aperture therethrough positioned in a spaced relation to said first named aperture for engaging said lug when said valve handle is in a second position.

7. The locking device of claim 6, wherein:
   a. said fixed locking member has a base portion mountable on said valve body and a side wall extending from the perimeter of said base portion, and
   b. said means to enclose and cover on said movable locking member has a top member having said apertures therethrough and having a side wall extending from the perimeter thereof, said movable locking member side wall being cooperatively engageable with said fixed locking member side wall for enclosing said juncture of said handle and said valve stem and for enclosing said point of attachment of said valve body and said fixed locking member.

8. In a valve having a body, a rotatable stem, and a handle secured to the stem for manual rotation of the stem between two positions, a locking device comprising:
   a. a fixed locking member mounted on said valve body,
   b. a movable locking member mounted on said handle for relative movement inwardly and outwardly relative to said valve body, and
   c. interfitting means on said movable locking member on said fixed locking member being engageable at one position upon inward movement of said movable locking member toward said valve body to prevent rotation of said handle and said stem.

9. The locking device of claim 8, additionally including:
   a. means on said interfitting and cooperating means to receive and mount a lock to secure said interfitting and cooperating means when positioned in one position,
   b. means on said movable locking member to enclose and cover the juncture of said handle and said rotatable stem for preventing tampering with and removing said handle from said rotatable stem when said locking device is secured and locked, and
   c. means on said fixed locking member cooperating with said means to enclose and cover on said movable locking member to enclose the juncture of said handle and said rotatable stem at a point of attachment of said valve body and said fixed locking member for preventing tampering with mounting of said locking members and said handle when secured and locked.

10. The locking device of claim 9, wherein:
   a. said interfitting and cooperating means has a lug member on said fixed locking member and a lug receiving aperture through said movable locking member, said lug being engageable in said aperture in an interfitting and cooperating relation when said valve handle is in a first position, and
   b. said lug having an aperture therethrough to receive and mount a locking bolt of a lock.

11. The locking device of claim 10, wherein:
   a. said movable locking member has a top member having a handle receiving aperture therethrough for receiving said handle and mounting said movable locking member on said handle, and another lug receiving aperture through said top member positioned in a spaced relation to said first named lug receiving aperture for engaging said lug when said valve handle is in a second position,
   b. said fixed locking member has a base portion mountable on said valve body, and a side wall extending from a portion of the perimeter of said base portion, and
   c. said means on said movable locking member to enclose and cover has a side wall extending from a portion of the perimeter of said top member to cooperatively engage said fixed locking member side wall.

12. A stem locking device for a valve having a body, a rotatable stem and a handle secured to the stem for manual rotation of same between two positions, said locking device comprising:

a. a fixed locking member and a movable locking member, b. said fixed locking member being rigidly mountable on a valve body, c. said movable locking member having an opening therethrough for mounting handle for relative movement outwardly and inwardly relative to said valve body, d. interfitting cooperating means on said fixed locking member and said movable locking member having a male member extending from said fixed locking member and having an aperture through said movable locking member with said male member being engageable in said aperture at one of said positions upon inward movement of said movable locking member relative to said fixed locking member to prevent rotation of said handle, and e. means on said movable locking member to enclose said handle at the juncture of said rotatable stem for preventing tampering with and to preclude removal of said handle from said rotatable stem when said movable locking member is secured to said fixed locking member.

* * * * *